US009639624B2

(12) United States Patent
Ishikawa et al.

(10) Patent No.: US 9,639,624 B2
(45) Date of Patent: May 2, 2017

(54) EXTRACTING COLOR SCHEMES OF PAGES WRITTEN IN A MARKUP LANGUAGE

(71) Applicant: International Business Machines Corporation, Armonk, NY (US)

(72) Inventors: Shunsuke Ishikawa, Tokyo (JP);
Keisuke Nitta, Kanagawa-ken (JP);
Takuya Tejima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 14/703,910

(22) Filed: May 5, 2015

(65) Prior Publication Data

US 2015/0325009 A1    Nov. 12, 2015

(30) Foreign Application Priority Data

May 7, 2014   (JP) ................................ 2014-096008

(51) Int. Cl.
| G09G 5/02 | (2006.01) |
| G06F 17/30 | (2006.01) |
| G06T 11/00 | (2006.01) |
| G06T 11/60 | (2006.01) |
| G06F 17/24 | (2006.01) |

(52) U.S. Cl.
CPC .......... *G06F 17/3089* (2013.01); *G06F 17/24* (2013.01); *G06T 11/001* (2013.01); *G06T 11/60* (2013.01)

(58) Field of Classification Search
None
See application file for complete search history.

(56) References Cited

U.S. PATENT DOCUMENTS

| 2004/0205514 | A1 | 10/2004 | Sommerer et al. |
| 2011/0072343 | A1* | 3/2011 | Baciu ..................... G06Q 30/02 715/275 |
| 2012/0179787 | A1* | 7/2012 | Walsh ................. H04L 63/0281 709/219 |

FOREIGN PATENT DOCUMENTS

| JP | H0749761 A | 2/1995 |
| JP | H07295532 A | 11/1995 |
| JP | H0830417 A | 2/1996 |
| JP | H09127924 A | 5/1997 |
| JP | H10500512 A | 1/1998 |
| JP | 2001142820 A | 5/2001 |
| JP | 2003016448 A | 1/2003 |
| JP | 2004086249 A | 3/2004 |
| JP | 2005190122 A | 7/2005 |
| JP | 2009294925 A | 12/2009 |
| JP | 2010118945 A | 5/2010 |
| JP | 2010224700 A | 10/2010 |
| JP | 2011086092 A | 4/2011 |

* cited by examiner

*Primary Examiner* — Frank Chen
(74) *Attorney, Agent, or Firm* — Jay Wahlquist

(57) ABSTRACT

An aspect includes extracting a color scheme of a page written in a markup language. A content portion from the page is nonvisualized, a subtractive process is applied to the page with the content portion having been nonvisualized, and a color scheme is extracted from the page to which the subtractive process has been applied.

17 Claims, 12 Drawing Sheets

252

253

231, 232, 233, 234, 235, 236

271

254

EXTRACTING COLOR SCHEMES OF PAGES WRITTEN IN A MARKUP LANGUAGE

BACKGROUND

At a website, colors perform various functions, such as conveying a certain impression on a website and to cause an idea associated with a specific service through a combination of colors.

Various tools have been developed that extract colors used in a website to acquire a color arrangement. For example, some web services provide the ability to analyze colors of a site based on a URL only using a simple operation of inputting a URL.

In organizational activities of companies, organizations or schools, e.g., colors (also referred to as corporate colors, symbol colors or school colors) perform important functions. These colors are often used to symbolize a corporation, organization, or school.

In addition, image colors or package colors of products or services themselves perform important roles for causing consumers to recognize products or services. Thus, for advertising corporations or their products or services, in all fields including websites, the corporations and the like tend to use an integral color scheme (also called a theme color). For instance, colors of logotypes of corporations and colors of packages of products are used as color schemes of websites.

SUMMARY

In an embodiment, a method of extracting a color scheme of a page written in a markup language is provided. The method causes an electronic apparatus to implement functions including nonvisualizing a content portion from the page, applying a subtractive process to the page with the nonvisualized content portion, and extracting the color scheme from the page to which the subtractive process has been applied.

A system and computer program product are also provided in accordance with embodiments.

DETAILED DESCRIPTION

Figure 1A:
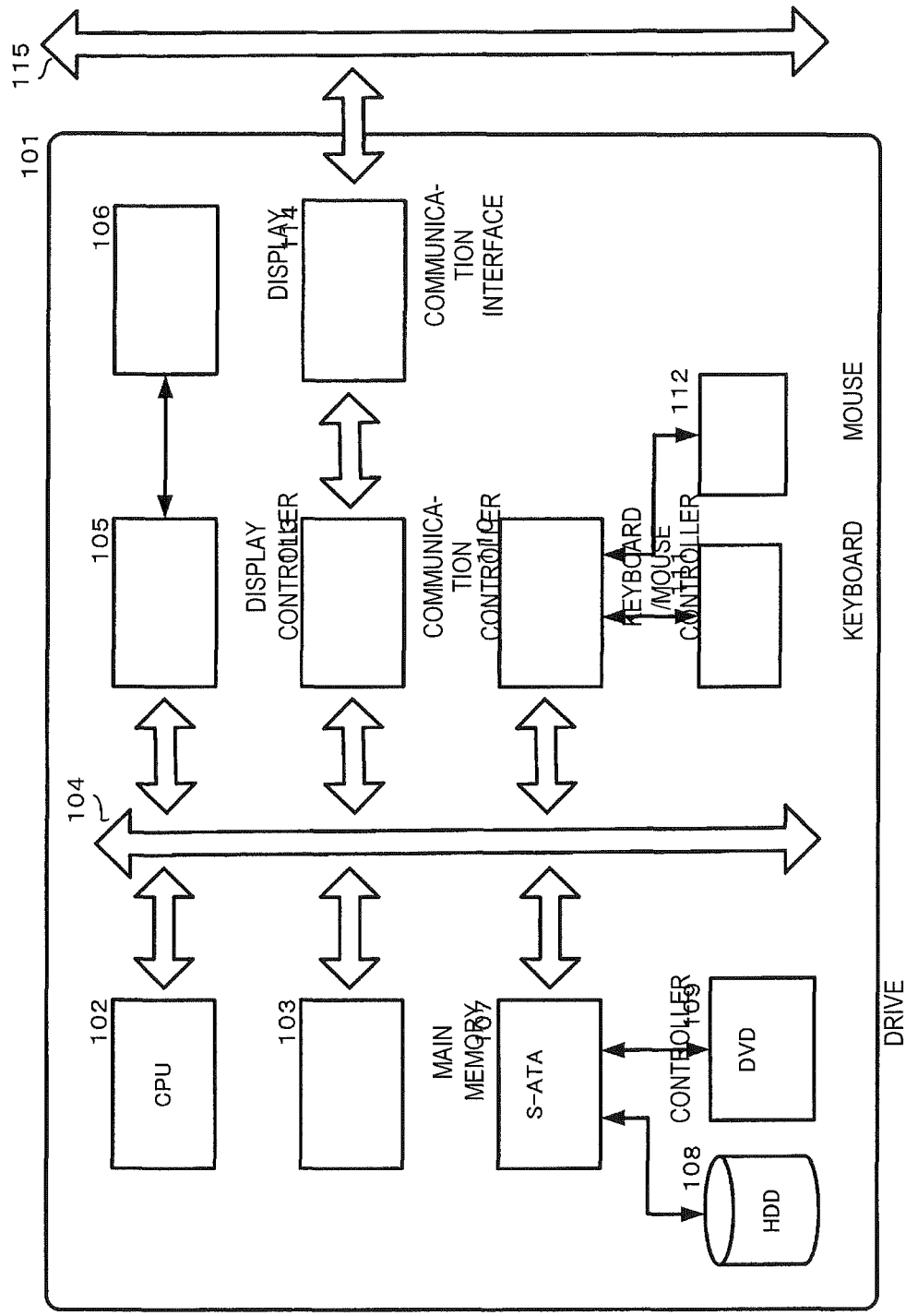
FIG. 1A is a diagram showing an example of hardware (electronic apparatus) according to or usable in an embodiment of the present invention.

Embodiments are hereinafter described according to the diagrams. Throughout the following diagrams, the same symbols indicate the same objects unless otherwise noted. It should be noted that the embodiments of the present invention are for describing aspects of the present invention, but are not intended to limit the scope of the embodiments.

In an embodiment, a page written in a markup language may be, for instance, a web page written in HTML, an application written in XML, or an operating system, which can be a mobile operating system application. The page written in the markup language may be acquired from the Internet, an intranet, or a storing medium (e.g., an internal storage device, an external storage device, or a network-attached storage (NAS)) accessible by an electronic apparatus that displays the page.

In the embodiments described herein, the color scheme refers to an arrangement of colors that can be used on the web, and the color scheme is also referred to herein as a color theme and/or a theme color. The color scheme may be, for instance, a color image of a corporation or its products, a color image of a corporate logo, or a color image of a website for a corporation or products. The color scheme includes what is also referred to herein as a corporate color, a symbol color or a school color.

In the embodiments described herein, the page includes a content portion and a theme portion. The content portion may be text, a moving image, or an image. The theme portion may be, for instance, a decoration.

An electronic apparatus that can be used in the embodiments described herein is any of electronic apparatuses capable of extracting the color scheme of a page written in a markup language, and is not particularly limited. The electronic apparatus may be, for instance, a computer, e.g., a mainframe computer, a server computer, a desktop computer, a notebook computer or an integrated type personal computer, or a tablet terminal or a smartphone.

Extraction of a color scheme of a website may be desired, e.g., in a scenario in which a client into which a package solution is installed customizes the user interface (UI) (e.g., web screen) of the installed package solution in conformity with the color scheme of the company's own site. More specifically, for instance, a color scheme is extracted from a website of a client or another medium (e.g., corporate logo or product package), and the color arrangement is used for the UI of the installed package solution, thereby making the UI similar to the color scheme of the client.

Extraction of a color scheme of a website may also be desired, e.g., in the case of constructing a client UI using an application programming interface (API) made public by a website. More specifically, for instance, in the case of a social media site in which a guideline of a color scheme is provided, it is not required to recognize the color arrangement of a color scheme. However, if the guideline is not provided, it is required to recognize the color arrangement.

Websites typically include many pieces of content other than the color scheme (e.g., text, moving images, or images). Accordingly, if a subtractive process is applied to a page of the website as it is, noise increases owing to the content, thereby reducing the accuracy of extracting a color scheme. Thus, in some cases, color schemes are determined by human sensitivity.

For instance, in the case where the area of the content in a page of a website is large in comparison with the entire page of the website, the color scheme, which should originally occupy a large area, is hidden. In such a case, colors extracted from the page of the website do not conform to the color scheme but conforms to the content. That is, since the color scheme is hierarchically hidden under the content, a subtractive process where area ratios are important elements cannot accurately extract the color scheme.

Exemplary embodiments provide the ability to automatically extract a color scheme from a page of a website, in which colors that are in conformity with content other than the color scheme are not extracted.

The embodiments provide a technique of extracting a color scheme of a page written in a markup language. This technique may include a method for extracting the color scheme, and an electronic apparatus for extracting the color scheme, and a computer program product for the electronic apparatus.

Figure 1B:
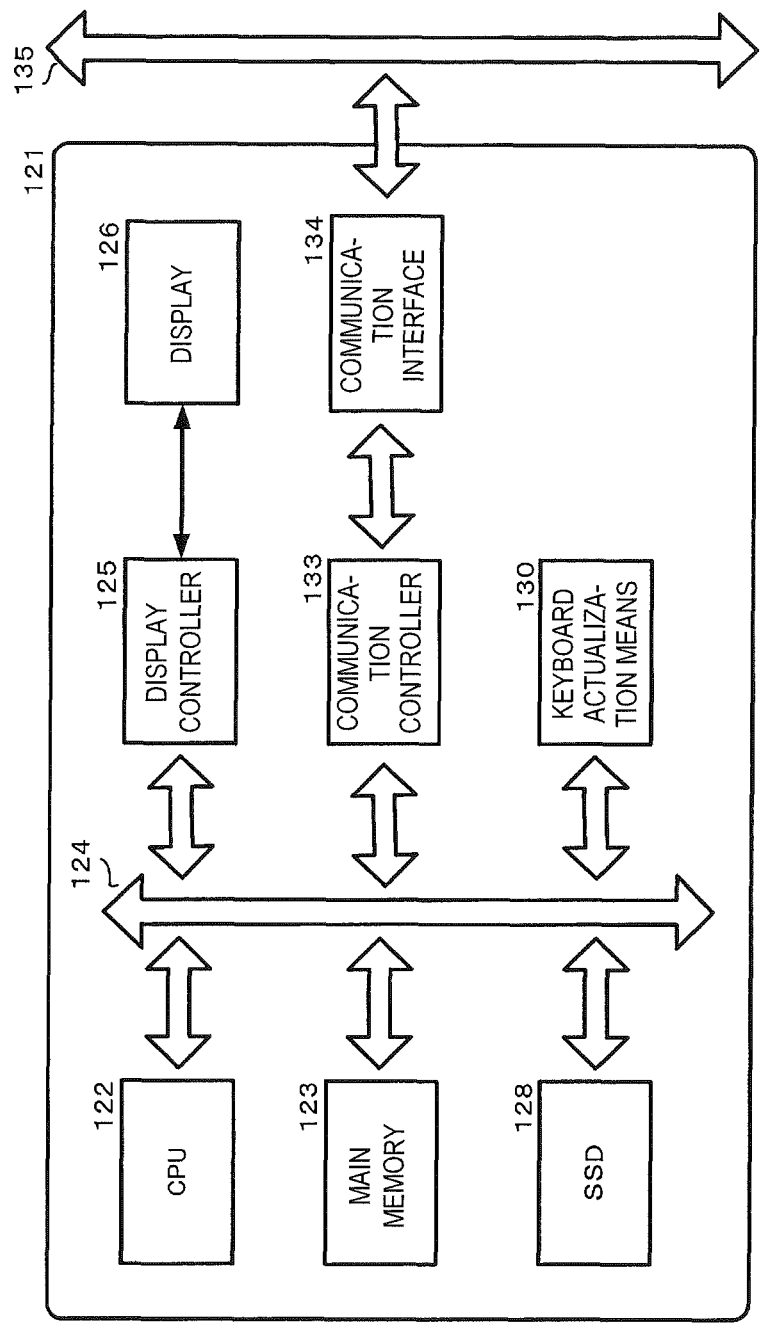
FIG. 1B is a diagram showing an example of hardware (electronic apparatus) according to or usable in an embodiment of the present invention.

FIGS. 1A and 1B are diagrams showing an example of systems (e.g., an electronic apparatus comprising hardware, software, and associated devices) according to an embodiment of the present invention.

FIG. 1A is a diagram showing an example of an electronic apparatus (e.g., a mainframe computer, a server computer, a desktop computer, a notebook computer or an integrated type personal computer) that can be used in the embodiments described herein.

An electronic apparatus (101) includes a CPU (102) and a main memory (103), which are connected to a bus (104). The CPU (102) may be based on a 32-bit or 64-bit architecture.

A display (106), for instance, a liquid crystal display (LCD), may be connected to the bus (104) via a display controller (105). The liquid crystal display (LCD) may be, for instance, a touch panel display or a floating touch display. The display (106) can be used for displaying, through an appropriate graphic interface, an object that is to be displayed by operation of software (e.g., a program for the electronic apparatus according to the embodiment of the present invention or various programs for the electronic apparatus operating on the electronic apparatus (101)). The display (106) can output, for instance, a screen of a web browser application.

A disk (108), for instance, a hard disk or a solid state drive (SSD) may be connected to the bus (104) through, for instance, a SATA or IDE controller (107).

A drive (109), for instance, a CD, DVD or BD drive may be connected to the bus (104) through, for instance, the SATA or IDE controller (107).

A keyboard (111) and a mouse (112) may be connected to the bus (104) through a peripheral device controller (110), for instance, a keyboard/mouse controller or a USB bus.

The disk (108) may store an operating system, a computer program according to the embodiments described herein, as well as other programs, and data, in a manner capable of being loaded into the main memory (103).

The disk (108) may be embedded in the electronic apparatus (101), connected via a cable accessibly by the electronic apparatus (101), or connected via a wired or wireless network accessibly by the electronic apparatus (101).

The drive (109) may be used for installing a program, for instance, an operating system, an application or a program for the electronic apparatus according to the embodiment of the present invention, from a CD-ROM, DVD-ROM or BD into the disk (108).

The communication interface (114) conforms to, for instance, the Ethernet protocol. The communication interface (114) is connected to the bus (104) via a communication controller (113), performs a function of connecting the electronic apparatus (101) to a communication line (115) in a wired or wireless manner, and provides a network interface layer for the TCP/IP communication protocol of the communication function of the operating system of the electronic apparatus (101). The communication line may be, for instance, a wireless LAN environment based on a wireless LAN connection standard, a Wi-Fi wireless LAN environment such as IEEE802.11a/b/g/n, or a mobile phone network environment (e.g., 3G or 4G environment).

FIG. 1B is a diagram showing an example of an electronic apparatus (that may be, for instance, a tablet terminal, a smartphone, an electronic book reader, or a mobile phone).

A CPU (122), a main memory (123), a bus (124), a display controller (125), a display (126), an SSD (128), a communication controller (133), a communication interface (134) and a communication line (135) of an electronic apparatus (121) shown in FIG. 1B correspond to the CPU (102), the main memory (103), the bus (104), the display controller (105), the display (106), the SSD (108), the communication controller (113), the communication interface (114) and the communication line (115) of the electronic apparatus (101) shown in FIG. 1A, respectively.

In the case where the electronic apparatus (121) is a tablet terminal, a smartphone, an electronic book reader, a mobile phone or the like, the CPU (122) may be, for instance, any of various CPUs for a tablet terminal, a smartphone, an electronic book reader or a mobile phone.

The SSD (128) disk may store, for instance, an OS for a tablet terminal, a smartphone, an electronic book reader, or a mobile phone, an application program according to the embodiments described herein, as well as other programs, and data, in a manner capable of being loaded into the main memory (123).

Keyboard actualization means (130) can display a software keyboard as an application on the display (126).

Figure 2A:
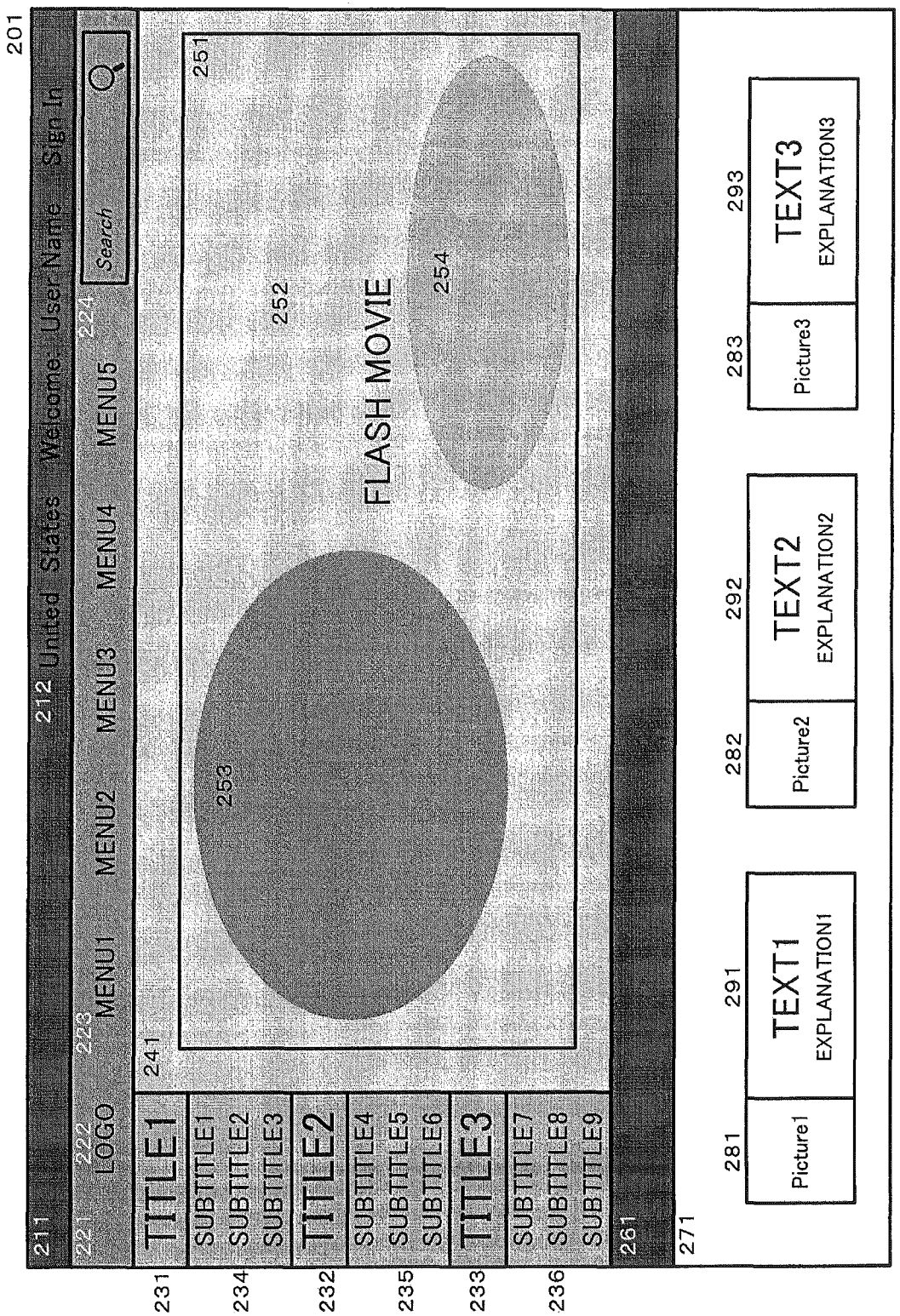
FIG. 2A shows a simulated web page before execution of a process of extracting a color scheme from a page written in a markup language.
Figure 2B:
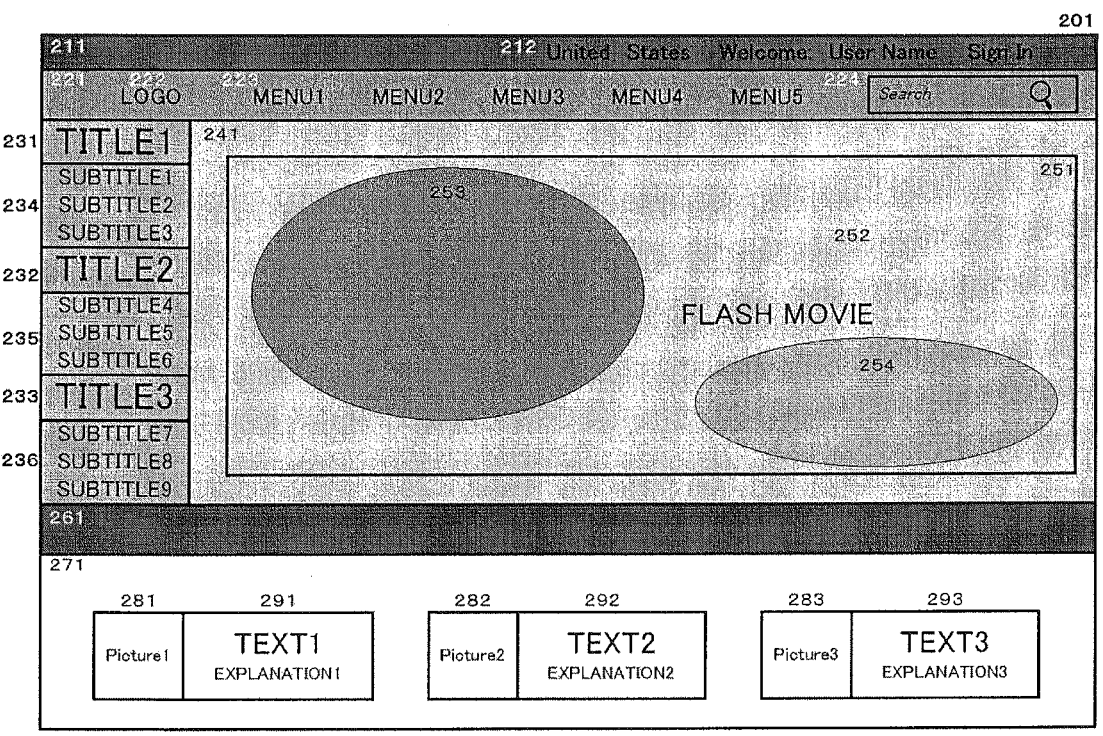
FIG. 2B shows an example of a color scheme acquired after execution of a process of extracting a color scheme from a simulated web page shown in FIG. 2A.
Figure 2B:
Figure 2B:
Figure 2B:
Figure 2B:
Figure 2B:

FIGS. 2A and 2B show a color scheme acquired after execution of a process of extracting the color scheme from a simulated web page shown in FIG. 2A FIG. 2A shows an example of a simulated web page (201) before execution of a process of extracting a color scheme from a page written in a markup language.

The simulated web page (201) shown in FIG. 2A includes texts (212; 222; 223; 231, 232 and 233; 234, 235 and 236; and 291, 292 and 293), a moving image (251), and images (281, 282 and 283).

On the simulated web page (201), the color scheme is a region (241), a region (271), regions (231, 232 and 233; 234, 235 and 236), regions (211 and 261), and a region (221) that are represented in gray scales and white.

On the simulated web page (201), the moving image (251) is overlaid as a content portion on the region (241). That is, the moving image (251) is on the top surface layer among display layers in the region (241); this layer is a layer that a user actually watches. The moving image (251) includes, e.g., a light blue region (253) and a yellow region (254), and a background pink region (252).

FIG. 2B shows an example of a color scheme acquired after execution of a process of extracting a color scheme from the simulated web page (201) shown in FIG. 2A.

A computer that extracts a color scheme using existing techniques applies a subtractive process to the simulated web page (201), and subsequently extracts the color scheme from the page to which the subtractive process has been applied.

As a result, pink of the region (252), light blue of the region (253), light gray of the regions (231, 232 and 233; 234, 235 and 236), white of the region (271), and yellow of the region (254) are extracted as the color scheme of the simulated web page (201).

This is because the moving image (251) on the region (241) has a large area occupying on the simulated web page (201) shown in FIG. 2A, and the moving image (251) includes the pink region (252), the light blue region (253), and the yellow region (254).

The computer for extracting the color scheme according to existing techniques thus extracts the colors on the moving image (251) as the color scheme. Accordingly, the computer does not appropriately extract the color scheme on the simulated web page (201).

As described above, a web page typically includes user content (a text, a moving image (Flash etc.) or an image (a photograph image etc.)) that is not relevant to a color scheme. Accordingly, even if a subtractive process is applied to the web page, the accuracy of extracting the color scheme becomes low. In particular, if the area occupied by the user content in the foreground of the web page is large, a base region for extracting the color scheme that is to have a large occupying area is hidden. Accordingly, if the subtractive process is applied to the web page, the accuracy of extracting the color scheme becomes low. That is, the user content that is not relevant to the color scheme becomes noise, and the color scheme of the web page cannot be appropriately extracted.

Figure 3A:
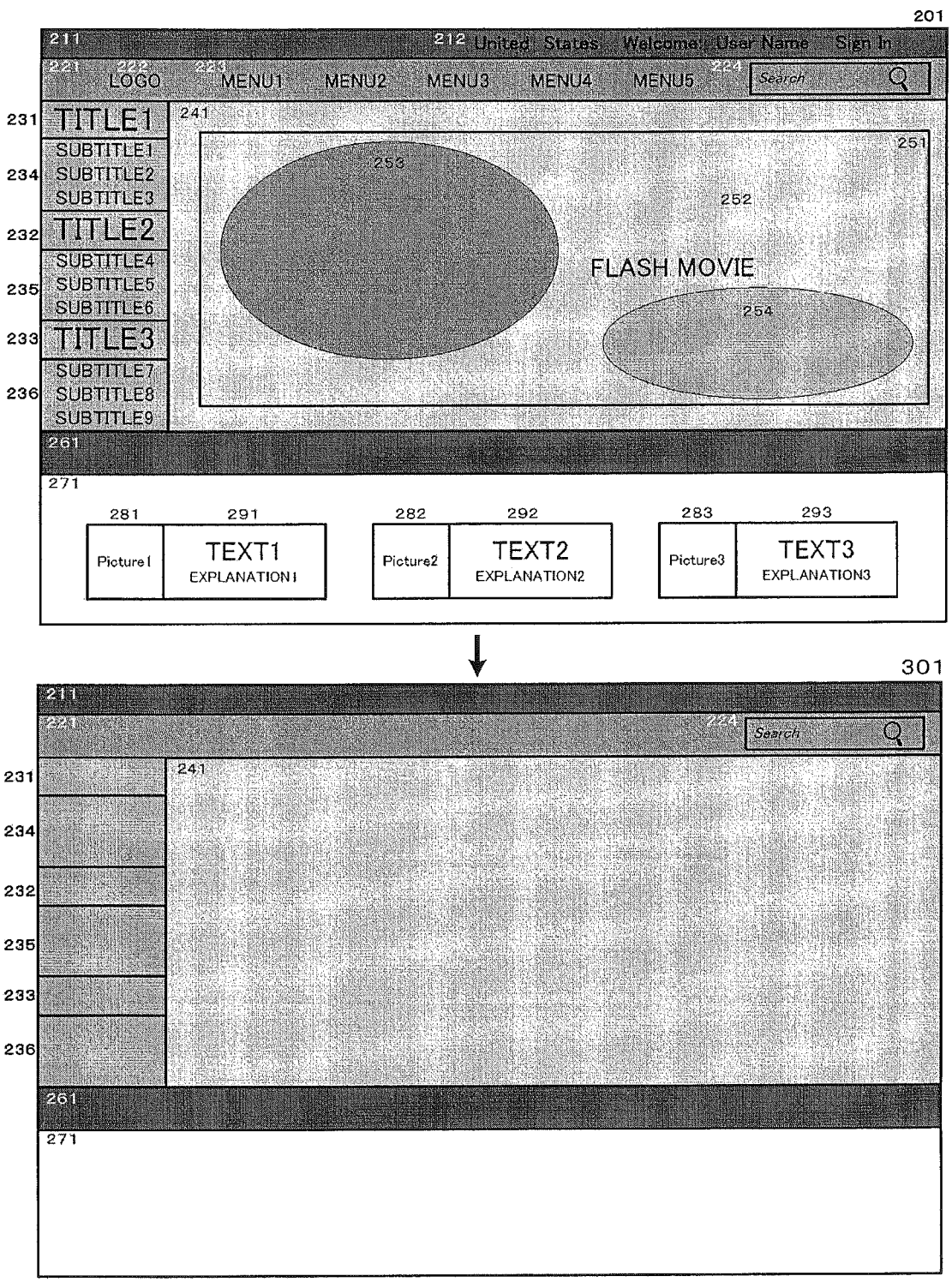
FIG. 3A shows an example of a screen of a page where a content portion is nonvisualized from the simulated web page shown in FIG. 2A for extracting a color scheme from the simulated web page according to the embodiment of the present invention.
Figure 3B:
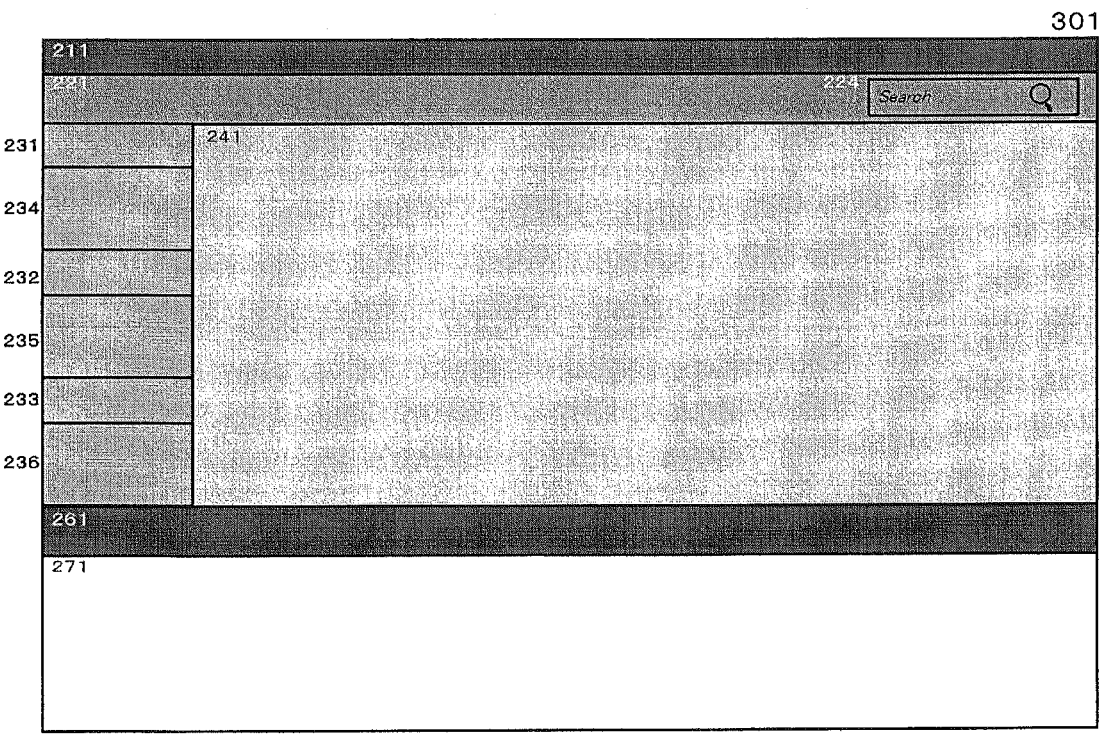
FIG. 3B shows an example of a color scheme acquired after execution of a process that nonvisualizes a content portion from a simulated web page (201) shown in FIG. 2A, applies a subtractive process to the nonvisualized page, and extracts the color scheme from the page to which the subtractive process has been applied, according to the embodiment of the present invention.
Figure 3B:
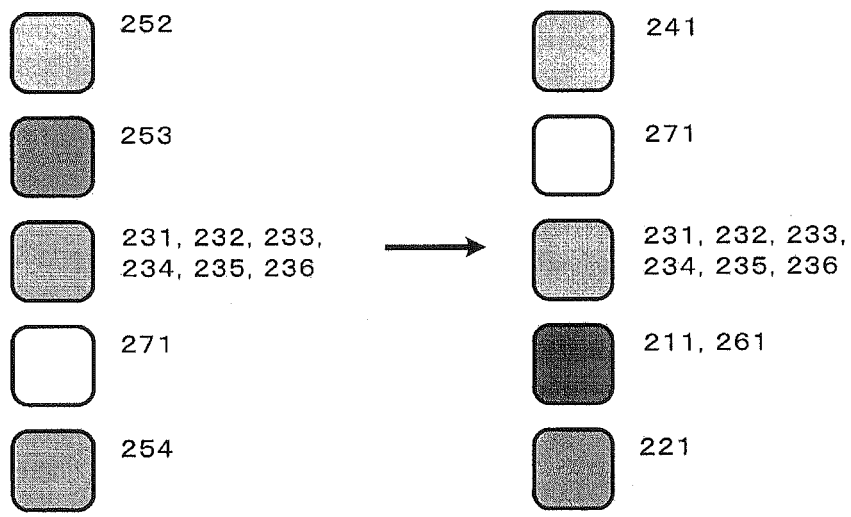

FIGS. 3A and 3B show a color scheme acquired after execution of a process of extracting a color scheme from the simulated web page shown in FIG. 2A according to an embodiment as described herein.

FIG. 3A shows an example of a screen of a page where a content portion is nonvisualized from the simulated web page shown in FIG. 2A for extracting the color scheme from the simulated web page.

The electronic apparatus according to an embodiment (e.g., the computer (101) shown in FIG. 1A or the computer (121) shown in FIG. 1B) nonvisualizes the content portion, i.e., texts (212; 222; 223; 231, 232 and 233; 234, 235 and 236; and 291, 292 and 293), from the simulated web page shown in FIG. 2A, while maintaining layout information.

Likewise, the electronic apparatus nonvisualizes the content portion, i.e., the moving image (251), from the simulated web page, while maintaining the layout information.

Likewise, the electronic apparatus nonvisualizes the content portion, i.e., the images (281, 282 and 283), from the simulated web page, while maintaining the layout information.

A screen (301) shows a screen after nonvisualization of the content portion from the simulated web page (201). Since the electronic apparatus cannot determine a text ("Search") in a search box (224) as a text, this text is not nonvisualized and remains as it is.

FIG. 3B shows an example of a color scheme acquired after execution of a process that nonvisualizes the content portion from the simulated web page (201) shown in FIG. 2A, applies a subtractive process to the nonvisualized page, and extracts the color scheme from the page to which the subtractive process has been applied, according to embodiments described herein.

The electronic apparatus applies, using existing techniques, the subtractive process to the page after nonvisualization of the content portion, and subsequently extracts the color scheme from the page to which the subtractive process has been applied.

As a result, light gray in the region (241), white in the region (271), light medium gray in the regions (231, 232 and 233; 234, 235 and 236), the dark gray in the regions (211 and 261), and the medium gray in the region (221) are extracted as the color scheme on the simulated web page (201).

This is because the content portion is nonvisualized from the simulated web page (201) shown in FIG. 2A while the layout information is maintained, and the color scheme intrinsic to the page thereby appears in the foreground.

Thus, according to the embodiments described herein, the content portion that is not relevant to the color scheme in the page written in the markup language is deleted. The base region for the color scheme under the layer of the content therefore appears in the foreground of the web page.

Figure 4:
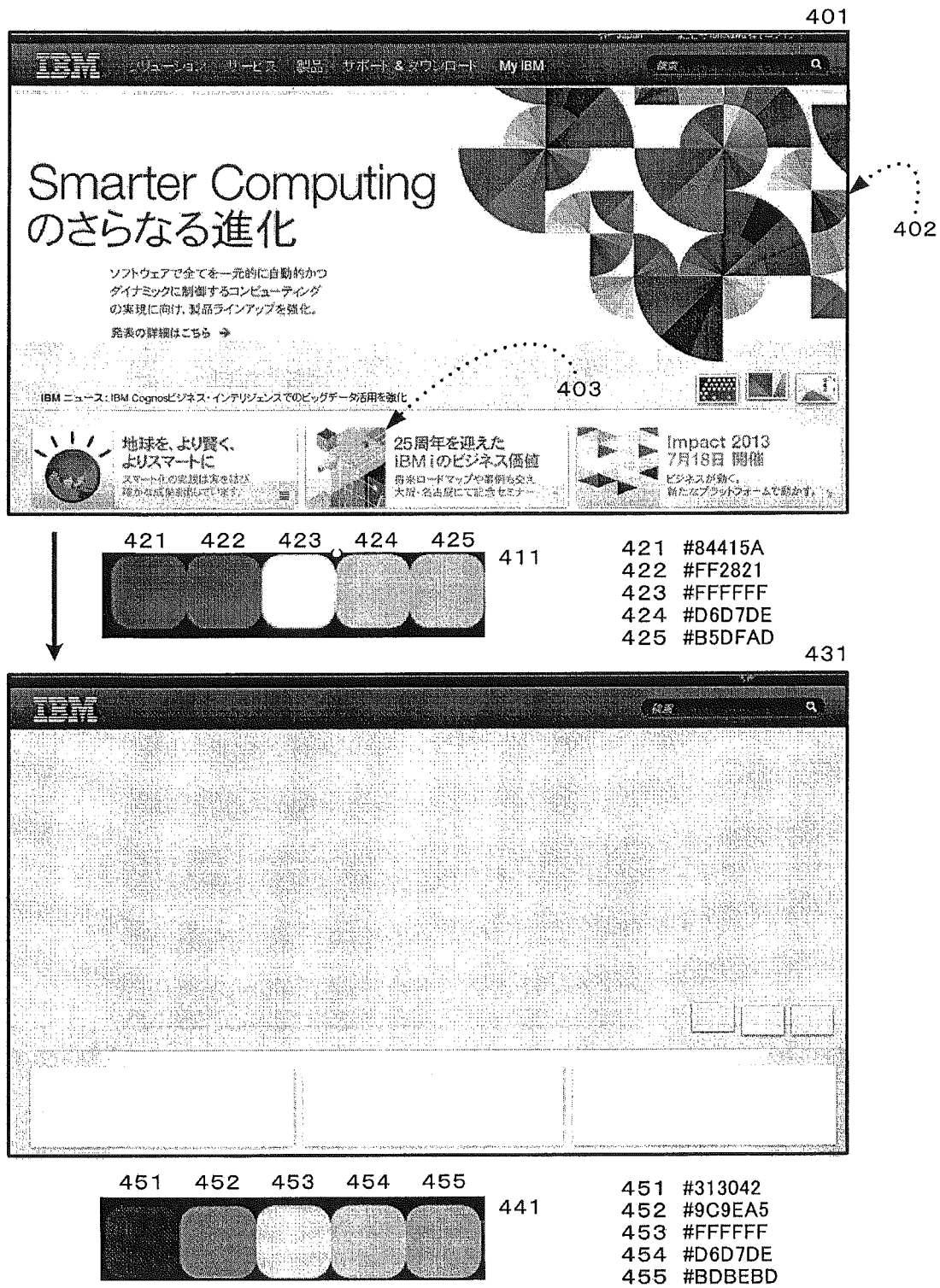
FIG. 4 shows a color scheme acquired after execution of a process of extracting the color scheme from an actual web page, and a color scheme acquired after execution of a process of extracting the color scheme from the actual web page.

FIG. 4 shows the color scheme acquired after execution of the process of extracting the color scheme from an actual web page according to existing techniques, and the color scheme acquired after execution of the process of extracting the color scheme from the actual web page according to the embodiments described herein.

A web page (401) is the actual web page, and is a page before execution of the process of extracting the color scheme from the page written in the markup language. The web page (401) includes an image (402), and the image is colorful, including red, pink, yellow and the like. The web page (401) includes the image (403), and the image is colorful, including greenish-yellow, green, light blue and the like.

The color scheme extracted from the web page (401) according to existing techniques is described below.

The computer for extracting the color scheme according to the existing techniques applies the subtractive process to the simulated web page (201), and subsequently extracts the color scheme from the page to which the subtractive process has been applied.

The color scheme (411) extracted as the result has a color code #84415A (421), a color code #FF2821 (422), a color code #FFFFFF (423), a color code #D6D7DE (424), and a color code #B5DFAD (425). The color code #84415A (421) and the color code #FF2821 (422) among the extracted color codes are from the image (402). The color code #B5DFAD (425) among the extracted color codes is from the image (403). Such extraction is due to the fact that the image (402) and the image (403) become noise in the web page (401).

The color scheme extracted from the web page (401) according to the embodiments will now be described.

A screen (431) shows a screen of the web page (401) whose content portion is nonvisualized for extracting the color scheme from the web page (401).

The electronic apparatus (e.g., the computer (101) shown in FIG. 1A or the computer (121) shown in FIG. 1B) according to the embodiments described herein nonvisualizes the content portion (i.e., the texts and images) from the web page (401) while maintaining the layout information.

The screen (431) shows the screen of the simulated web page (401) whose content portion is nonvisualized. Since the electronic apparatus cannot determine a text ("Search") in the search box as a text, this text is not nonvisualized and remains as it is.

The electronic apparatus applies the subtractive process to the page whose content portion has been nonvisualized, and extracts the color scheme from the page to which the subtractive process has been applied. The method of applying the subtractive process and the method of extracting the color scheme may be any method according to the existing techniques.

The color scheme (441) extracted as the result has a color code #313042 (451), a color code #9C9EA5 (452), a color code #FFFFFF (453), a color code #D6D7DE (454), and a color code #BDBEBD (455). The result represents the color scheme intrinsic to the web page (401).

Figure 5A:
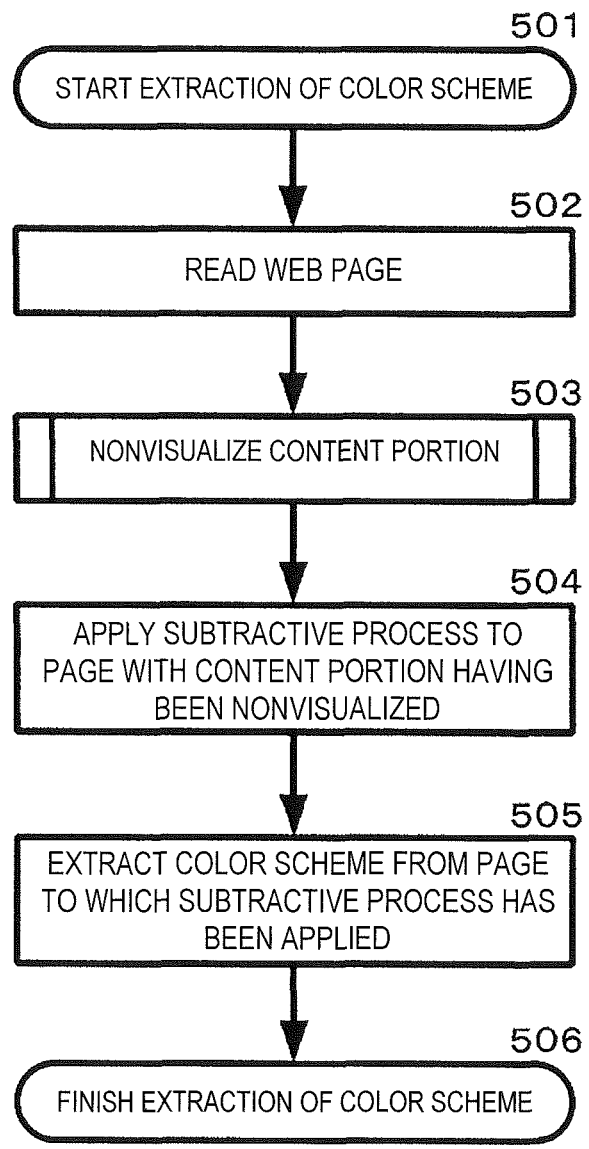
FIG. 5A shows a flowchart for extracting a color scheme of a page written in the markup language according to the embodiment of the present invention.
Figure 5B:
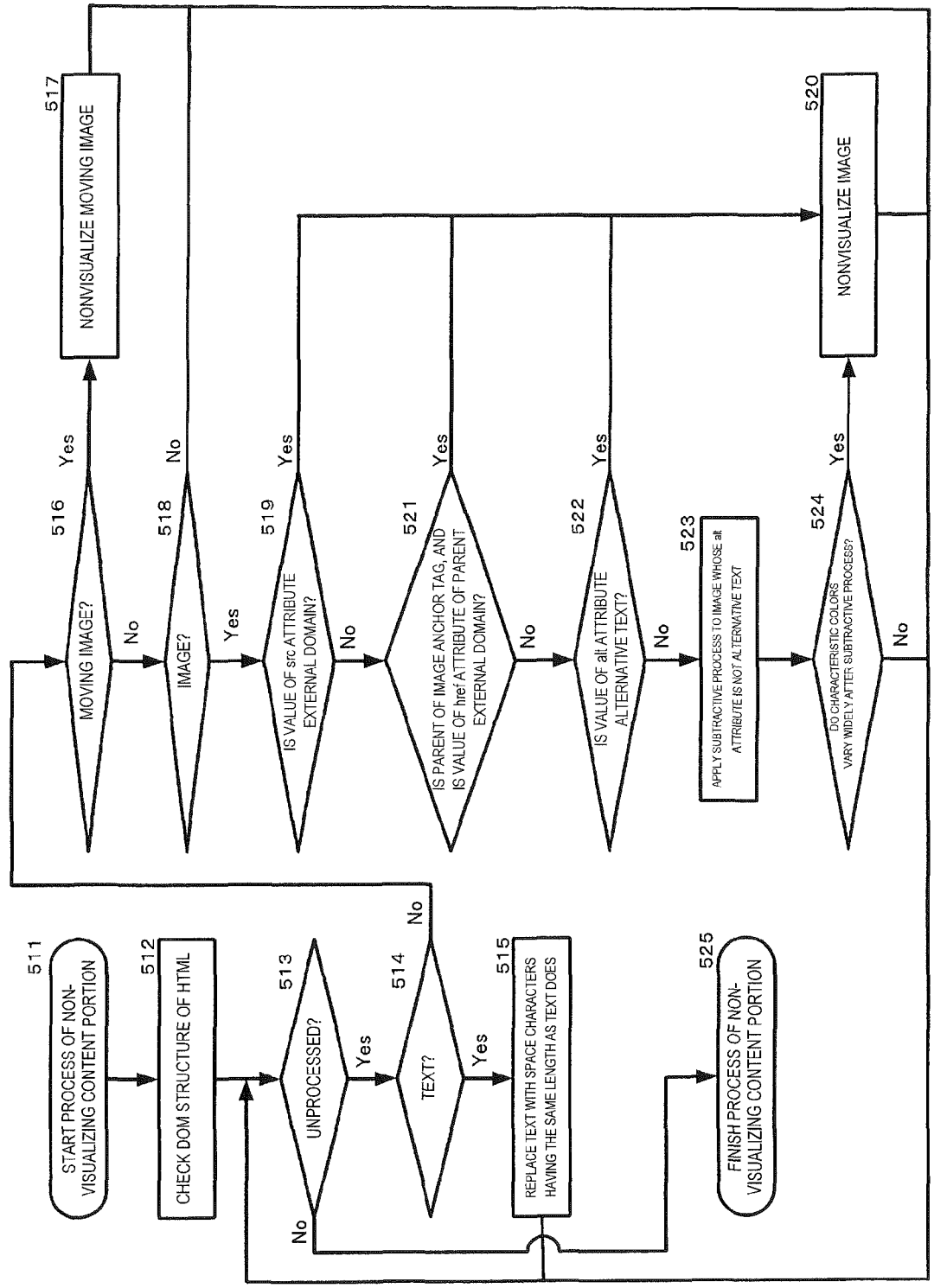
FIG. 5B shows a flowchart for a process of nonvisualizing a content portion in the flowchart shown in FIG. 5A.

FIGS. 5A and 5B show flowcharts of extracting the color scheme of a page written in the markup language according to the embodiments described herein.

FIG. 5A shows a flowchart of an entire process of extracting the color scheme of the page according to an embodiment. Hereinafter, the electronic apparatus in the description on FIGS. 5A and 5B may be, for instance, the computer (101) shown in FIG. 1A or the computer (121) shown in FIG. 1B.

In step 501, the electronic apparatus starts the process of extracting the color scheme of the page.

In step 502, the electronic apparatus acquires the page to be processed for extracting the color scheme, for instance, via the Internet or from a storing medium accessible from the electronic apparatus, and read the acquired page into the storing means of the electronic apparatus, such as memory (103) shown in FIG. 1A, memory (123) shown in FIG. 1B, storage device (108) shown in FIG. 1A or storage device (128) shown in FIG. 1B.

In step 503, the electronic apparatus nonvisualizes the content portion from the page acquired in step 502. The details of the nonvisualization will be described with reference to the flowchart shown in FIG. 5B.

In step 504, the electronic apparatus applies the subtractive process to the page whose content portion has been nonvisualized in step 503. The subtractive process may be any subtractive process that is known to those skilled in the art, including uniform quantization, a popularity algorithm, a median cut algorithm, or octree algorithm. However, the process is not limited thereto.

In step 505, the electronic apparatus extracts the color scheme from the page to which the subtractive process has been applied in step 504. The extraction of the color scheme may be any color scheme extraction known to those skilled in the art.

In step 506, the electronic apparatus finishes the process of extracting the color scheme of the page.

The electronic apparatus may present the extracted color scheme for the user, after the process of extracting the color of the page. The presentation is performed by displaying the extracted color scheme, for instance, on a screen device, e.g., the display (106) shown in FIG. 1A or the display (126) shown in FIG. 1B. Alternatively, the presentation may be performed by, for instance, causing a printer to print the extracted color scheme. Alternatively, the presentation may be performed by, for instance, transmitting data on the extracted color scheme to an application.

FIG. 5B shows a flowchart for a process of nonvisualizing the content portion in the flowchart shown in FIG. 5A.

Nonvisualization of the content portion is performed depending on whether the content portion is text data (hereinafter, also simply referred to as "text"), a moving image, or an image.

The following steps 514 to 515 show processes in the case where the content portion is a text. If the content portion is a text, it is a user content. Accordingly, the electronic apparatus nonvisualizes the text.

The following steps 516 to 517 show processes in the case where the content portion is a moving image. If the content portion is a moving image, it is a user content. Accordingly, the electronic apparatus nonvisualizes the moving image.

The following steps 519 to 525 show processes in the case where the content portion is an image. If the content portion is an image, it is not necessarily a user content and may be an image for, e.g., a theme portion. If the content portion is an image, the electronic apparatus then determines whether the image is not an image for a theme portion and is a user content, and then nonvisualizes the image if the image is a user content.

In step 511, the electronic apparatus starts the process of nonvisualizing the content portion.

In step 512, the electronic apparatus checks the document object model (DOM) structure of the page acquired in step 502. The check on the DOM structure may be performed by checking the DOM structure of the HTML of the page. The electronic apparatus can recognize one or more content portions (e.g., the portions may be a text, a moving image, or an image) by checking the DOM structure, as will be described in the following step 513.

In step 512, the electronic apparatus analyzes the meanings of elements of the page acquired in step 502. The electronic apparatus can recognize the link destination of an image (e.g., the value of a "src" attribute) that will be described in step 519, the parent of the image being an anchor tag and the link destination of the parent (e.g., the value of a "href" attribute) that will be described in step 521, and the value of an attribute (e.g., the value of an "alt" attribute) of an element defining a character string to be displayed instead of an image that will be described in the following step 522, by analyzing the meanings of the elements.

In step 513, the electronic apparatus recognizes the one or more content portions from the check result of the DOM structure in step 512, and determines whether the content portions include any unprocessed content portion for which the determination processes shown in the following steps 514, 516, 518, 519, 520, 521 and 523 have not been performed. Each node that constructs the DOM structure includes information indicating what that node represents. The electronic apparatus can then recognize the content structure from the DOM structure by referring to the information. For instance, in the case of HTML, a node has a tag name. If the tag name is IMG, the electronic apparatus recognizes the content as an image. If one or more unprocessed content portions exist, the electronic apparatus takes one of the unprocessed content portions and advances the processing to step 514. In contrast, the electronic apparatus finishes the process and advances the processing to step 525 if there is no unprocessed content portion.

In step 514, the electronic apparatus determines whether the content portion recognized in step 513 is a text or not. The electronic apparatus advances the processing to step 515 if the content portion is a text. In contrast, the electronic apparatus advances the processing to step 516 if the content portion is not a text.

In step 515, the electronic apparatus nonvisualizes the text if the content portion is a text. The electronic apparatus nonvisualizes the text while maintaining the layout information. The nonvisualization of the text with the layout information being maintained is performed to prevent the display area in which the text is displayed on the page from being reduced.

The text is nonvisualized by, for instance, hiding the display of the text, deleting the text, causing display under the layer of the text to appear into the foreground, or making the display of the text transparent.

The display of the text may be made transparent, for instance, while maintaining the height and width (i.e., area) of the text by a certain method. The display of the text may be made transparent by, for instance, replacing the text with space characters having the same length as that of the text. Alternatively, the display of the text may be made transparent by, for instance, setting the height of the text to thereby maintain the height of a portion where the text exists, and setting the width of the text to thereby maintain the width of the portion where the text exists. The height of the portion where the text exists may be maintained by, for instance, setting a line-height property. The line-height property is a property used for designating the height of a line. The width of the portion where the text exists may be maintained by, for instance, using space characters having the same character size as that of the text, particularly, by, for instance, using space characters having the same character size and the same font type as those of the text.

In step 516, the electronic apparatus determines whether the content portion recognized in step 513 is a moving image or not. The moving image may be implemented using various formats, such as .wmv, .fly, .AVI, .mov, and .mp4. However, the format is not limited thereto. The electronic apparatus advances the processing to step 517 if the content portion is a moving image. In contrast, the electronic apparatus advances the processing to step 518 if the content portion is not a moving image.

In step 517, the electronic apparatus nonvisualizes the moving image if the content portion is the moving image. The electronic apparatus nonvisualizes the moving image by maintaining the layout information so that the display area in which the moving image is displayed on the page is not reduced.

The moving image may be nonvisualized by, for instance, hiding the display of the moving image. Furthermore, the moving image may be nonvisualized by, for instance, hiding display of the moving image and its descendant if the moving image has a descendant of the moving image. The descendant of the moving image is, for instance, a character string (text) displayed in a manner overlaid on the moving image, and the character string may be stationary or moving. The display of the moving image or the display of the moving image and its descendant can be hidden by designating a style to erase the display of the moving image. The designation of the style may be, for instance, "CSS visibility: hidden;". The erasure of the moving image through designation of the style can cause the background color hidden under the moving image to appear into the foreground.

Alternatively, the moving image may be nonvisualized by, for instance, deleting the moving image while maintaining the layout information.

Alternatively, the moving image may be nonvisualized by, for instance, causing display (i.e., a portion to form a color scheme) under the layer of the moving image to appear into the foreground. The appearance into the foreground may be achieved by moving the display (a layer associated with the color scheme) under the layer of the moving image to a top layer, or placing the display immediately under a transparent layer, on the page.

Alternatively, the moving image may be nonvisualized by, for instance, making the display of the moving image transparent.

The electronic apparatus returns the processing to step 513 in response to completion of nonvisualization of the moving image, and repeats the processes in and after step 513.

In step 518, the electronic apparatus determines whether the content portion recognized in step 513 is an image or not. The image may be in, for instance, any of formats of GIF, JPEG and PNG. However, the format is not limited thereto. The electronic apparatus advances the processing to step 519 if the content portion is an image. In contrast, the electronic apparatus returns the processing to step 513 and repeats the processes in and after step 513 if the content portion is not an image.

In step 519, the electronic apparatus determines whether the link destination of the image is an external domain or not when the content portion is an image. The determination whether the link destination of the image is an external domain or not is performed by, for instance, determining whether the value of "src" attribute of HTML is an external domain or not. The "src" attribute is an attribute for setting a position to which an image displayed in a page is linked. The electronic apparatus advances the processing to step 520 if the link destination of the image is an external domain. In contrast, the electronic apparatus advances the processing to step 521 if the link destination of the image is not an external domain.

In step 520, the electronic apparatus nonvisualizes the image according to the determination result in step 519, i.e., that the link destination of the image is an external domain. If the image is linked to an external domain, it is highly possible that the image is for advertisement. Accordingly, an image whose link destination is an external domain can be determined as a user content rather than a theme portion.

The electronic apparatus nonvisualizes the image while maintaining the layout information, so that the area in which the image is displayed on the page is not reduced.

The image may be nonvisualized by, for instance, hiding display of the image. Alternatively, the image may be nonvisualized by, for instance, hiding display of the image and its descendant in the case where the image has a descendant thereof. The descendant of the image may be, for instance, a character string (text) displayed in a manner overlaid on the image. Display of the image may be hidden or display of the image and the descendant may be hidden by erasing display of the image through designation of a style. The designation of the style may be, for instance, "CSS visibility:hidden;". Display of the image is thus erased by the designation of the style, thereby allowing, for instance, the background color hidden under the image to appear onto the foreground layer.

Alternatively, the image may be nonvisualized by, for instance, deleting the image while maintaining the layout information.

Alternatively, the image may be nonvisualized by, for instance, causing display (i.e., a portion to form a color scheme) under the layer of the image to appear into the foreground. Appearance into the foreground may be achieved by moving the display (a layer associated with the color scheme) under the layer of the image to the top layer, or placing the display immediately under a transparent layer.

Alternatively, the image may be nonvisualized by, for instance, making display of the image transparent.

The electronic apparatus returns the processing to step 513 in response to completion of nonvisualization of the image, and repeats the processes in and after step 513.

In step 521, the electronic apparatus determines whether the parent of the image is an anchor tag and the link destination of the parent is an external domain or not when the link destination of the image is not an external domain. The anchor tag may be, for instance, tag "<A>" of HTML. The tag "<A>" encloses an image, and the image is clickable. The tag "<A>" is a tag for designating a start point and a destination of the link. The determination whether the link destination of the parent is an external domain or not may be performed by, for instance, determining whether the value of "href" attribute of the tag "<A>" is an external domain or not. The "href" attribute is an attribute for use at the start point for the link destination of HTML. The electronic apparatus advances the processing to step 520 if the parent of the image is an anchor tag and the link destination of the parent is an external domain. In contrast, the electronic apparatus advances the processing to step 522 if the condition defined in step 521 is not satisfied.

In step 520, the electronic apparatus nonvisualizes the image when the determination result in step 521 is "yes", i.e., the parent of the image is an anchor tag and the link destination of the parent is an external domain. It is highly possible that the image whose parent is an anchor tag with the link destination of the parent being an external domain is, for instance, an advertisement. Accordingly, the image whose parent is an anchor tag with the link destination of the parent being an external domain can be determined as a user content rather than a theme portion.

In step 522, the electronic apparatus determines whether the image has the attribute of an element of defining a character string to be displayed instead of the image, and the value of this attribute is an alternative text, and this alternative text is a meaningful sentence or not. The element of defining a character string to be displayed instead of the image may be, for instance, an attribute associated with accessibility information, e.g., an "alt" attribute of HTML. The "alt" attribute is a tag for designating an alternative character string that is to replace the image. The determination that the alternative text is a meaningful sentence is made, for instance, when the text includes at least two words. Note that the alternative text may sometimes be a meaningful sentence even when the text has one word. The electronic apparatus advances the processing to step 520 if the image has the attribute of an element of defining a character string to be displayed instead of the image, and the value of this attribute is an alternative text, and this alternative text is a meaningful sentence. In contrast, the electronic apparatus advances the processing to step 523 if the condition defined in step 523 is not satisfied.

In step 520, the electronic apparatus nonvisualizes the image when the determination result in step 522 is "yes", i.e., the image has the attribute of an element of defining a character string to be displayed instead of the image, and the value of the attribute is an alternative text, and the alternative text is a meaningful sentence. If the image does not have the attribute of an element of defining a character string to be displayed instead of the image, the image can be determined as a theme portion. Also, even if the image has the attribute of an element of defining a character string to be displayed instead of the image, the image can be determined as a theme portion if the value of the attribute is not an alternative text, or the alternative text is not a meaningful sentence. Accordingly, the image which has the attribute of an element of defining a character string to be displayed instead of the image, with the value of the attribute being an alternative text, and the alternative text being a meaningful sentence, can be determined as a user content rather than a theme portion.

In step 523, the electronic apparatus applies the image subtractive process to the image that does not satisfy the condition defined in step 523. The electronic apparatus may use any subtractive process known to those skilled in the art, in a manner identical to the subtractive process in the step 504.

In step 524, the electronic apparatus determines whether the variation in characteristic colors in the image to which the subtractive process in step 523 has been applied is larger than a prescribed threshold or not. If the variation is larger, the electronic apparatus determines that the image is an image including certain user content (e.g., a photograph image). This is because if the image is an image of the theme portion, gradations may be used, and it is not likely that a number of significantly different colors are used as in a photograph. The prescribed threshold may be a parameter appropriately set by those skilled in the art. The electronic apparatus advances the processing to step 520 if the variation in the characteristic colors in the image to which subtractive process has been applied is larger than the prescribed threshold. In contrast, the electronic apparatus returns the processing to step 513 and repeats the processes in and after step 513 if the variation in the characteristic colors in the image to which the subtractive process has been applied is equal to or smaller than the prescribed threshold.

In step 520, the electronic apparatus nonvisualizes the image when the determination in step 524 is "yes", i.e., the variation in the characteristic colors in the image to which the subtractive process has been applied is larger than the prescribed threshold.

In step 525, the electronic apparatus finishes the process of nonvisualizing the content portion.

Figure 6A:
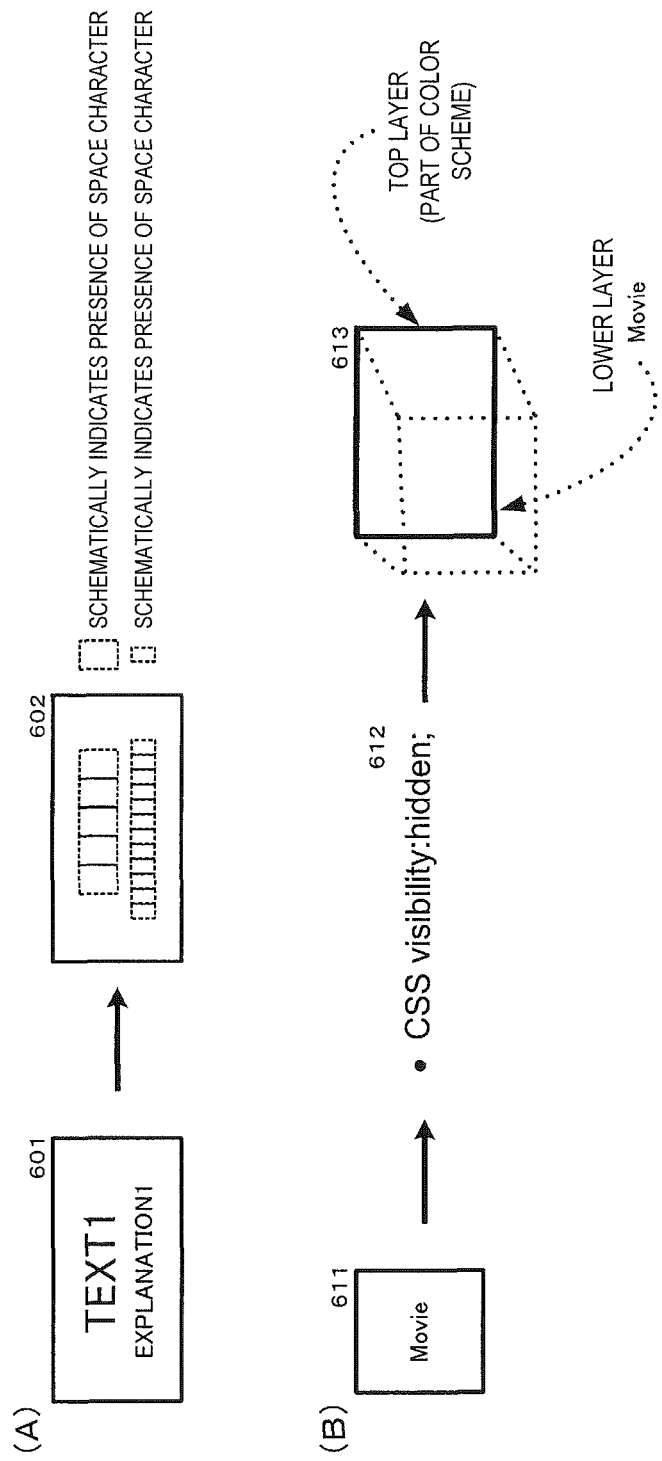
FIG. 6A shows various aspects of a nonvisualizing content portion (text or a moving image) from a page written in the markup language according to the embodiment of the present invention.
Figure 6B:
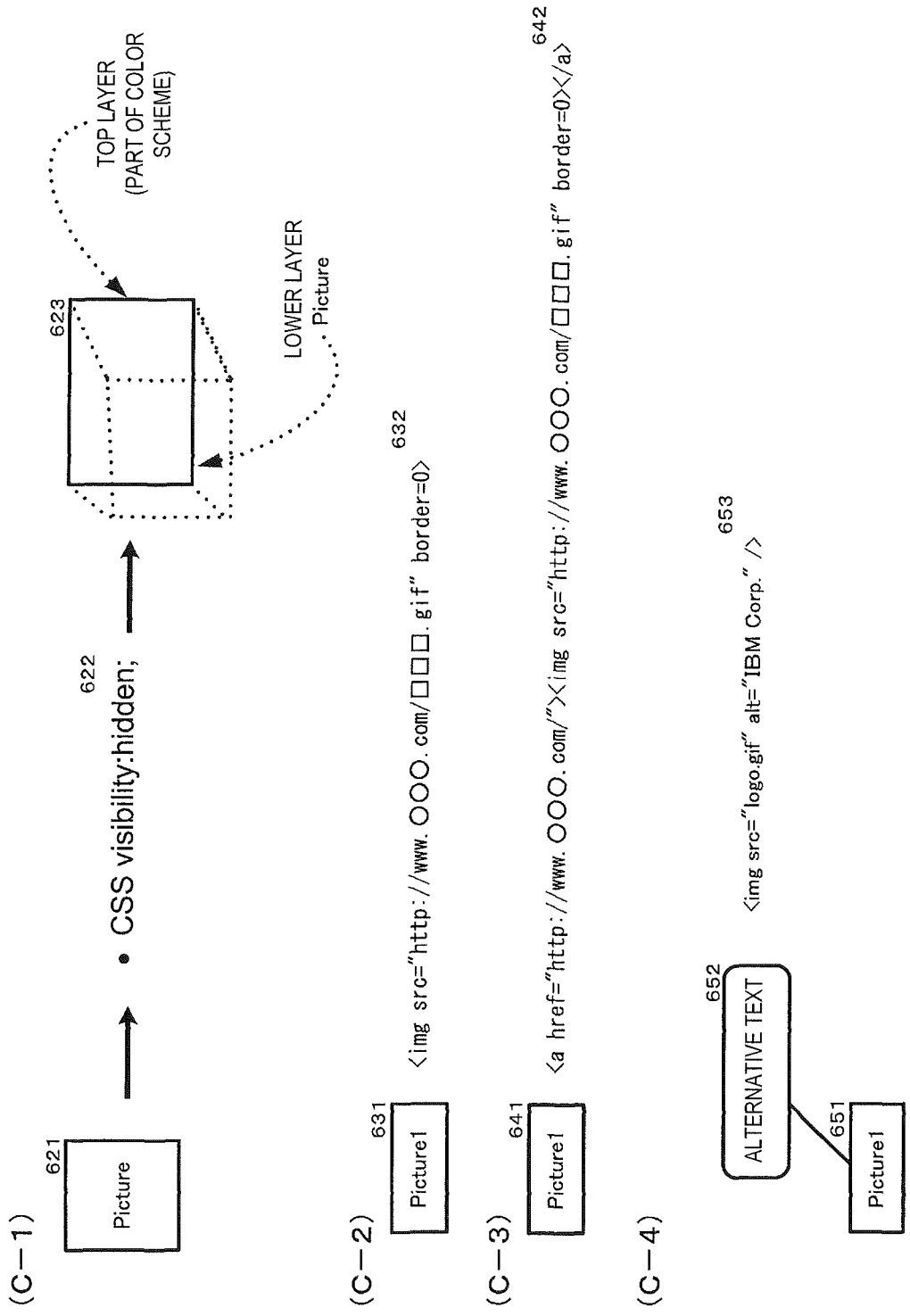
FIG. 6B shows various aspects of a nonvisualizing content portion (an image) from a page written in the markup language according to the embodiment of the present invention.

FIGS. 6A and 6B show various aspects that nonvisualize the content portion (a text, a moving image or an image) from the page written in the markup language according to the embodiment of the present invention.

FIG. 6A shows examples of (A) the case where the content portion is a text, and (B) the case where the content portion is a moving image, among various aspects for nonvisualizing the content portion.

If the content portion (601) is a text, the electronic apparatus nonvisualizes display of the text using space characters so as to maintain the height and width (i.e., area) of the text. That is, the electronic apparatus makes display of the text transparent using space characters.

In the example (A) shown in FIG. 6A, text portions corresponding to "TEXT1" and "EXPLANATION1" are replaced with space characters that have the same character size and the same font type as the original texts, respectively (see 602).

If the content portion (611) is a moving image, the electronic apparatus nonvisualizes the moving image by causing display (i.e., a portion to form a color scheme) under the layer of the moving image to appear into the foreground. That is, the electronic apparatus overlays the display under the layer, on the moving image.

The example (B) in FIG. 6A shows that the background color (i.e., color scheme) hidden under the layer where the moving image is displayed appears on the top surface layer by erasing the moving image through designation of a style that is "CSS visibility:hidden;" (612) (see 613).

FIG. 6B shows examples (C-1) to (C-4) of nonvisualizing the content portion where the content portion is an image.

In the case where a content portion (621) is an image, the electronic apparatus nonvisualizes display of the image by causing display (i.e., a portion to form a color scheme) under the layer of the image to appear into the foreground. That is, the electronic apparatus overlays the display under the layer, on the image.

The example (C-1) in FIG. 6B shows that the background color (i.e., color scheme) hidden under the layer on which the image is displayed appears on the top surface layer by erasing the image through designation of a style that is "CSS visibility:hidden;" (622) (see 623).

The electronic apparatus determines that the content portion (631) is an image and the link destination of the image is an external domain "http://www.○○○.com" (see 632). The electronic apparatus nonvisualizes the image because the link destination of the image is an external domain (see step 520).

The electronic apparatus determines that the content portion (641) is an image, and the parent of the image is an anchor tag, and the link destination of the parent is an external domain (see 642). The electronic apparatus nonvisualizes the image because the parent of the image is an anchor tag, and the link destination of the parent is an external domain (see step 521).

The electronic apparatus determines that the content portion (651) is an image, and the image has the attribute of an element of defining a character string ("IBM Corp.") that is to be displayed instead of the image, and the value of the attribute is an alternative text, and the alternative text is a meaningful sentence. The electronic apparatus nonvisualizes the image because the image has the attribute of an element of defining a character string that is to be displayed instead of the image, and the value of the attribute is an alternative text, and the alternative text is a meaningful sentence (see step 522).

Figure 7:
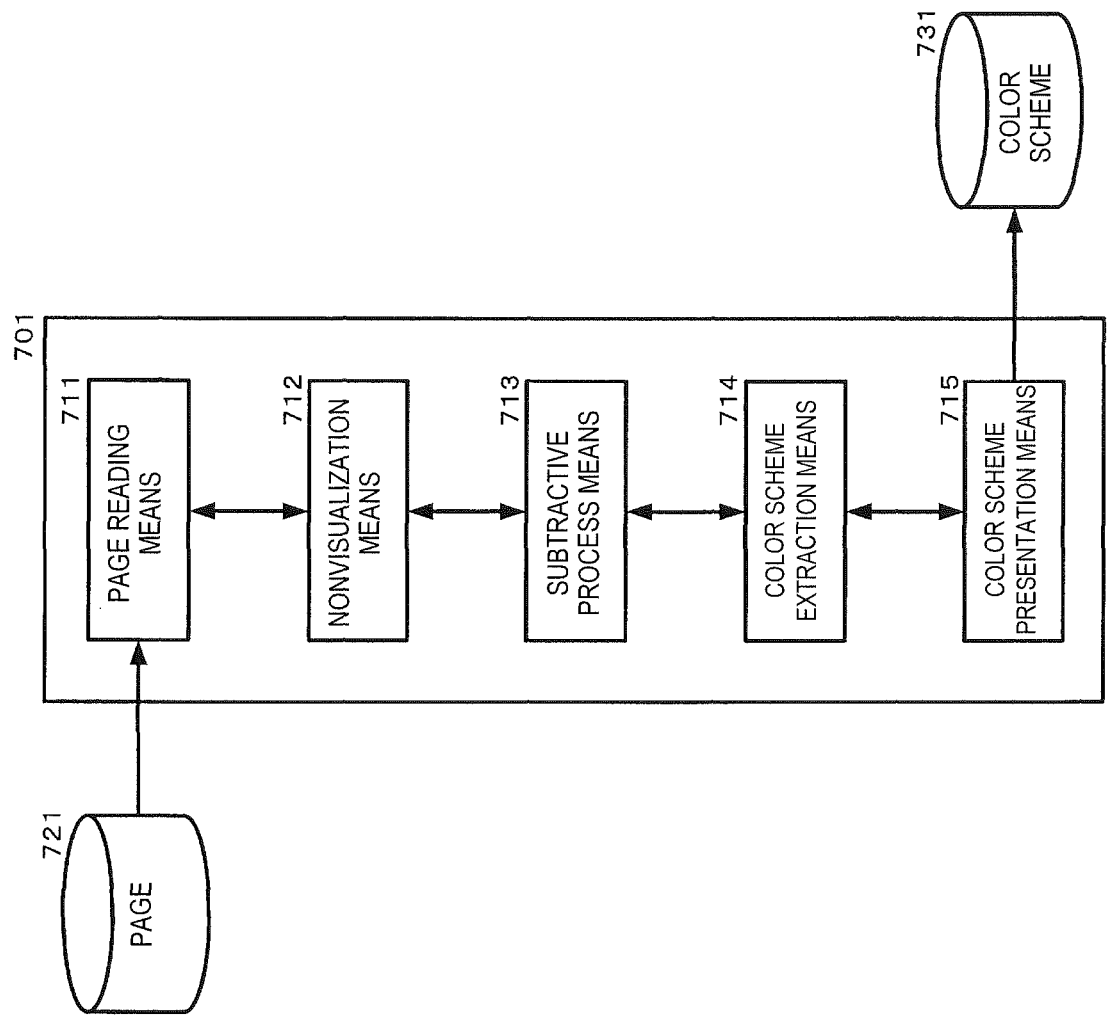
FIG. 7 is a diagram showing an example of a functional block diagram of an electronic apparatus that includes a hardware configuration according to FIG. 1A or 1B, and performs a process of extracting a color scheme of a page written in the markup language according to the embodiment of the present invention.

FIG. 7 is a diagram showing an example of a functional block diagram of an electronic apparatus that includes a hardware configuration according to FIG. 1A or 1B and executes a process of extracting the color scheme of a page written in the markup language according to the embodiment of the present invention.

The electronic apparatus (701) executes a process of extracting a color scheme of a page written in a markup language according to the embodiment of the present invention and may be, for instance, the computer (101) shown in FIG. 1A or the computer (121) shown in FIG. 1B.

The electronic apparatus (701) includes page reading means (711), nonvisualization means (712), subtractive process means (713), color scheme extraction means (714), and color scheme presentation means (715).

The page reading means (711) reads a page written in a markup language into storing means of the electronic apparatus (701). The storing means may be, for instance, memory (103) shown in FIG. 1A, memory (123) shown in FIG. 1B, storage device (108) shown in FIG. 1A or storage device (128) shown in FIG. 1B.

The page reading means (711) may execute step 502 shown in FIG. 5A.

The nonvisualization means (712) nonvisualizes the content portion from the page written in the markup language.

If the content portion is a text, the nonvisualization means (712) may nonvisualize the text.

If the content portion is a text, the nonvisualization means (712) may make display of the text transparent.

If the content portion is a text, the nonvisualization means (712) may replace the text with space characters having the same length as that of the text.

If the content portion is a moving image, the nonvisualization means (712) may nonvisualize the image.

If the content portion is a moving image, the nonvisualization means (712) may nonvisualize the moving image by hiding display of the moving image or display of the moving image and the descendant thereof, deleting the moving image, or causing display under the layer of the moving image to appear into the foreground.

If the content portion is an image and the link destination of the image is an external domain, the nonvisualization means (712) may nonvisualize the image.

If the content portion is an image and the link destination of the image is an external domain, the nonvisualization means (712) may nonvisualize the image.

If the content portion is an image, and the parent of the image is an anchor tag, and the link destination of the parent is an external domain, the nonvisualization means (712) may nonvisualize the image.

If the content portion is an image, and the image has the attribute of an element of defining a character string that is to be displayed instead of the image, and the value of the attribute is an alternative text, and the alternative text is a meaningful sentence, the nonvisualization means (712) may nonvisualize the image.

If the content portion is an image, and the image does not have an attribute associated with accessibility information, and the image has the attribute of an element of defining a character string that is to be displayed instead of the image, and the value of the attribute is an alternative text, and the alternative text is a meaningful sentence, the nonvisualization means (712) may nonvisualize the image.

The nonvisualization means (712) may hide display of the image or display of the image and descendant thereof, delete the image, or cause display under the layer of the image to appear into the foreground.

The nonvisualization means (712) may hide display of the content portion, delete the content portion, cause display under the layer of the content portion to appear into the foreground, or make display of the content portion transparent.

The nonvisualization means (712) may nonvisualize the content portion while maintaining the layout information.

The nonvisualization means (712) may analyze the meaning of the document object model structure of the page and the element.

The nonvisualization means (712) may execute step 503 shown in FIG. 5A. The nonvisualization means (712) may execute steps 512 to 530 shown in FIG. 5B.

The subtractive process means (713) applies the subtractive process to the page after nonvisualization of the content portion by the nonvisualization means (712).

The subtractive process means (713) may execute the following processes in corporation with the nonvisualization means (712). The subtractive process means (713) applies the subtractive process to the image if the content portion is an image and the image does not have an attribute associated with accessibility information. The nonvisualization means (712) may nonvisualize the image if the image after the subtractive process by the subtractive process means (713) has a large variation in characteristic colors.

Furthermore, the subtractive process means (713) may execute the following processes in corporation with the nonvisualization means (712). The subtractive process means (713) applies the subtractive process to the image if the content portion is an image and the image has an attribute associated with accessibility information but the value of the attribute is not an alternative text. The nonvisualization means (712) may then nonvisualize the image if the image after the subtractive process by the subtractive process means (713) has a large variation in characteristic colors.

The subtractive process means (713) may execute the following processes in cooperation with the nonvisualization means (712). If the content portion is an image, the nonvisualization means (712) may nonvisualize the image in at least one of the cases: (1-1) the case where the link destination of the image is an external domain; (1-2) the case where the parent of the image is an anchor tag and the link destination of the parent is an external domain; and (1-3) the case where the image has an attribute associated with accessibility information and the value of the attribute is an alternative text. The subtractive process means (713) may apply the subtractive process to an image which has not been nonvisualized by any of (1-1) to (1-3). The nonvisualization means (712) may nonvisualize the image if the image after the subtractive process by the subtractive process means (713) has a large variation in characteristic colors.

The subtractive process means (713) may execute step 504 shown in FIG. 5A.

The color scheme extraction means (714) extracts the color scheme from the page to which the subtractive process means (713) has applied the subtractive process.

The color scheme extraction means (714) may execute step 505 shown in FIG. 5A.

The color scheme presentation means (715) presents, to the user, the color scheme extracted by the color scheme extraction means (714).

A program for an electronic apparatus according to an embodiment may be stored in any type of computer-readable recording means, including at least one of a flexible disk, MO, CD-ROM, DVD, BD, a hard disk apparatus, and USB-connectable memory medium, ROM, MRAM, and RAM. The program for the electronic apparatus may be downloaded from another computer, e.g. a server computer, connected through a communication line, or copied from other recording means, for the sake of being stored into the recording means. The program for the electronic apparatus according to an embodiment of the present invention may be compressed or divided into multiple pieces and then stored in a single or multiple pieces of recording means. Note that it is a matter of course that a program product for an electronic apparatus according to the embodiment of the present invention may be provided in various forms. The program product for the electronic apparatus according to the embodiment of the present invention may include, for instance, a storing medium that stores a program for the electronic apparatus or a transmission medium that transmits the program for the electronic apparatus.

It is a matter of course that those skilled in the art easily assume various modifications, e.g., that each hardware configuration element of the electronic apparatus used in the embodiment of the present invention is combined with multiple machines, and functions are assigned to the machines and performed. It is a matter of course that these modifications are encompassed by the idea of the present invention. Note that these configuration elements are only exemplified. Not all of the configuration elements are necessary configuration elements.

The present invention may be implemented as hardware, software, or a combination of hardware and software. Typical example among examples of execution by a combination of hardware and software is execution in the electronic apparatus in which the program for the electronic apparatus is installed. In such a case, the program for the electronic apparatus is loaded into a memory for the electronic apparatus and executed, thereby causing the electronic apparatus to control the electronic apparatus and executes processes according to the present invention. The program for the electronic apparatus may include a group of instructions that can be written using any language, code, or notation. Such a group of instructions enables the electronic apparatus to execute a specific function directly, or to execute a process according to the embodiment of the present invention after execution of one or both of 1) conversion into another language, code or notation, and 2) copying to another medium.

According to the embodiment of the present invention, the content portion other than the color scheme on the page written in the markup language is nonvisualized. Accordingly, the color scheme under the layer of the content portion appears into the foreground of the page. That is, the surface area in which the color scheme under the layer of the content portion is displayed is increased. Accordingly, the accuracy of extracting the color scheme from the page is increased by applying a subtractive process to the page after nonvisualization of the content portion, and extracting the color scheme from the page to which the subtractive process has been applied.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method of extracting a color scheme of a page written in a markup language, the method comprising:
   nonvisualizing a content portion from the page;
   applying a subtractive process to the page with the nonvisualized content portion; and
   extracting the color scheme from the page to which the subtractive process has been applied;
   wherein upon determining the content portion is an image, the nonvisualizing the content portion includes:
   applying the subtractive process to the image which has not been nonvisualized; and
   upon determining characteristic colors vary to a specified degree in the image after the subtractive process, nonvisualizing the image in at least one of the following cases:
   a case where a link destination of the image is an external domain;

a case where a parent of the image is an anchor tag, and a link destination of the parent is an external domain;

a case where the image has an attribute associated with accessibility information but a value of the attribute is not an alternative text; and a case where the image has an attribute associated with accessibility information, and a value of the attribute is an alternative text.

2. The method of claim 1, wherein upon determining the content portion is a text, the nonvisualizing the content portion includes nonvisualizing the text.

3. The method of claim 2, wherein the nonvisualizing the text includes making a display of the text transparent.

4. The method of claim 2, wherein the nonvisualizing the text includes replacing the text with space characters having the same length as that of the text.

5. The method of claim 1, wherein upon determining the content portion is a moving image, the nonvisualizing the content portion includes nonvisualizing the moving image.

6. The method of claim 5, wherein the nonvisualizing the moving image includes at least one of:

hiding a display of the moving image, or a display of the moving image and a descendant thereof, deleting the moving image, and causing a display under a layer of the moving image to appear into a foreground.

7. The method of claim 1, wherein upon determining the content portion is an image, and a parent of the image is an anchor tag, and a link destination of the parent is an external domain, the nonvisualizing the content portion includes nonvisualizing the image.

8. The method of claim 1, wherein upon determining the content portion is an image, and the image has an attribute of an element of defining a character string to be displayed instead of the image, and a value of the attribute is an alternative text, and the alternative text is a sentence, the nonvisualizing the content portion includes nonvisualizing the image.

9. The method of claim 1, wherein the nonvisualizing the content portion includes:

applying, upon determining the content portion is an image and the image does not have an attribute associated with accessibility information, a subtractive process to the image; and nonvisualizing the image, upon determining characteristic colors vary to a specified degree in the image after the subtractive process.

10. The method of claim 1, wherein the step of nonvisualizing the image includes at least one of:

hiding a display of the image or display of the image and a descendant thereof, deleting the image, and causing a display under a layer of the image to appear into a foreground.

11. The method of claim 1, wherein the nonvisualizing the content portion includes at least one of:

hiding a display of the content portion, deleting the content portion, causing a display under a layer of the content portion to appear into a foreground, and making a display of the content portion transparent.

12. The method of claim 1, wherein the nonvisualizing the content portion includes nonvisualizing the content portion while maintaining layout information.

13. The method of claim 1, wherein the nonvisualizing the content portion includes analyzing a document object model structure, and a meaning of an element of the page.

14. The method of claim 1, further comprising:

reading the page into a storing means.

15. The method of claim 1, wherein the content portion is one of a text, a moving image, and an image.

16. A system for extracting a color scheme of a page written in a markup language, the system comprising:

a memory having computer readable instructions; and a processor for executing the computer readable instructions, the computer readable instructions including:

nonvisualizing a content portion from the page;

applying a subtractive process to the page with the nonvisualized content portion; and extracting the color scheme from the page to which the subtractive process has been applied;

wherein upon determining the content portion is an image, the nonvisualizing the content portion includes:

applying the subtractive process to the image which has not been nonvisualized; and upon determining characteristic colors vary to a specified degree in the image after the subtractive process, nonvisualizing the image in at least one of the following cases:

a case where a link destination of the image is an external domain;

a case where a parent of the image is an anchor tag, and a link destination of the parent is an external domain;

a case where the image has an attribute associated with accessibility information but a value of the attribute is not an alternative text; and a case where the image has an attribute associated with accessibility information, and a value of the attribute is an alternative text.

17. A computer program product for extracting a color scheme of a page written in a markup language, the computer program product comprising a non-transitory computer readable storage medium having program instructions embodied therewith, the program instructions executable by a computer processor to cause the computer processor to perform a method, comprising:

nonvisualizing a content portion from the page;

applying a subtractive process to the page with the nonvisualized content portion; and extracting the color scheme from the page to which the subtractive process has been applied;

wherein upon determining the content portion is an image, the nonvisualizing the content portion includes:

applying the subtractive process to the image which has not been nonvisualized; and upon determining characteristic colors vary to a specified degree in the image after the subtractive process, nonvisualizing the image in at least one of the following cases:

a case where a link destination of the image is an external domain;

a case where a parent of the image is an anchor tag, and a link destination of the parent is an external domain;

a case where the image has an attribute associated with accessibility information but a value of the attribute is not an alternative text; and a case where the image has an attribute associated with accessibility information, and a value of the attribute is an alternative text.

\* \* \* \* \*